United States Patent [19]

Slavin et al.

[11] 4,193,060
[45] Mar. 11, 1980

[54] CONTROL CIRCUIT FOR A TONE GENERATOR

[75] Inventors: Michael Slavin, Troy; Irvin B. Rea, Royal Oak, both of Mich.

[73] Assignee: Lectron Products, Inc., Troy, Mich.

[21] Appl. No.: 956,606

[22] Filed: Nov. 1, 1978

[51] Int. Cl.$^2$ ............................................. G08B 19/00
[52] U.S. Cl. .............................. 340/52 D; 340/52 F; 340/384 E; 340/393
[58] Field of Search ................. 340/52 D, 52 E, 52 F, 340/384 R, 384 E, 392, 393, 519, 520, 509, 517, 521

[56] References Cited

U.S. PATENT DOCUMENTS

| | | | |
|---|---|---|---|
| 3,744,022 | 7/1973 | Olsen | 340/384 E |
| 3,774,148 | 11/1973 | McIntosh | 340/384 E |
| 3,872,470 | 3/1975 | Hoerz et al. | 340/384 E |
| 4,088,995 | 5/1978 | Paladino | 340/384 E |

Primary Examiner—Alvin H. Waring
Attorney, Agent, or Firm—Harness, Dickey & Pierce

[57] ABSTRACT

A control circuit for a tone generator that is adapted to cause the tone generator to produce a plurality of readily distinguishable audible sounds, including a chime sound, a pulse tone and a steady tone. The control circuit has particular application for use on an automobile to monitor such conditions as "seat belts buckled", "headlamps on", and "key in the ignition". The control circuit includes three oscillator circuits that are adapted to produce square wave output signals at three different frequencies. The chime sound is generated by pulse width modulating the highest frequency signal and "restriking" the decaying sound at the frequency of the lowest frequency oscillator. The steady tone is produced by driving the tone generator directly with the output signal from the highest frequency oscillator. To generate the pulse tone, the highest frequency oscillator is repeatedly enabled and disabled in accordance with the output signal from the middle frequency oscillator. Novel pulse width modulating circuitry for producing the chime sound is also disclosed.

21 Claims, 2 Drawing Figures

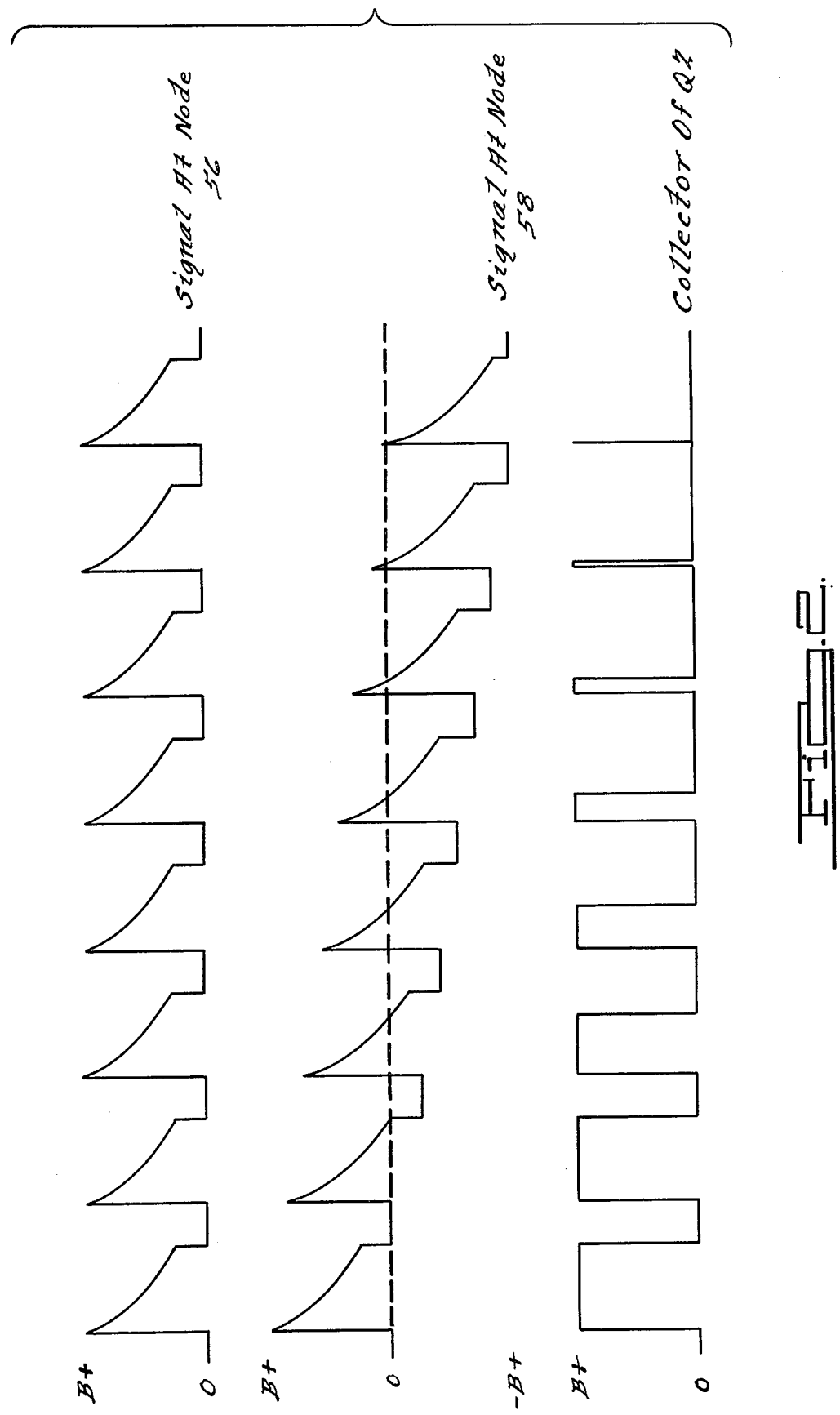

CONTROL CIRCUIT FOR A TONE GENERATOR

BACKGROUND AND SUMMARY OF THE INVENTION

The present invention relates to a control circuit for a tone generator and in particular to a control circuit that is adapted to cause the tone generator to produce a plurality of perceptively distinguishable audible sounds, including a chime sound, a pulse tone and a steady tone.

Current federal regulations require that all automobiles be equipped with devices that will provide a four to eight second audible warning whenever the automobile is attempted to be operated without the seat belts properly fastened. Such devices typically take the form of a buzzer unit that is controlled by a bimetallic timer circuit which is adjusted to time out within the prescribed time period. In addition, the same buzzer unit is typically utilized to also provide an audible signal to indicate other monitored conditions, such as when the keys are left in the ignition or when the headlamps are left on after the ignition is turned off.

Devices of this type have two basic disadvantages. Not only is the sound produced by such buzzer units unpleasant and often irritating, but the same audible sound is produced for all three warning conditions. Hence, it is often not immediately discernable by the operator of the vehicle which of the monitored conditions is triggering the alarm.

Thus, it is one of the principal objects of the present invention to provide an improved control circuit that is adapted to cause the tone generator to which it is connected to produce readily distinguishable audible signals for each of the conditions monitored. In particular, the present control circuit is adapted to drive a tone generator to produce a chime sound, a pulse tone, or a steady tone, depending upon the particular enabling signal received. Thus, it can readily be seen that the present invention is particularly suited for use in an automobile to control an audible warning device that is utilized to monitor the three conditions noted, namely, the seat belts, the headlamps, and the ignition key. Moreover, it will also be appreciated from the following description of the preferred embodiment herein that the present invention is adapted to drive the tone generator so that the sounds produced are pleasant to the ear.

In addition, it will also be seen that the control circuit of the present invention is reliable, relatively simple in design, and therefore exceptionally low in cost. Moreover, the size of the circuit board required for the control circuit is small, thus making the control circuit further suitable for automotive use where space is at a premium.

In general, the control circuit for the present invention comprises three oscillator circuits: a high frequency oscillator, a low frequency oscillator, and a middle frequency oscillator. The oscillators comprise simple logic gate circuits that are adapted to produce square wave output signals. The high frequency oscillator and the low frequency oscillator are utilized to produce the chime sound. In particular, the high frequency oscillator establishes the tone of the chime and the low frequency oscillator provides the "striking" rate of the chime. As will subsequently be described in greater detail, the high frequency oscillator signal is pulse width modulated in a novel manner to produce the desired decay effect in the amplitude of the sound.

The steady tone is produced simply by driving the tone generator with the output signal from the high frequency oscillator. The pulse tone, on the other hand, is generated by enabling the middle frequency oscillator and utilizing the output signal therefrom to control the enabling of the high frequency oscillator. Thus, the tone produced for the steady tone is pulsed at the rate of the output signal from the middle frequency oscillator.

Additional objects and advantages of the present invention will become apparent from a reading of the detailed description of the preferred embodiment which makes reference to the following set of drawings in which:

BRIEF DESCRIPTION OF THE DRAWINGS

FIG. 2 is a timing diagram illustrating the manner in which the pulse width modulated chime signal is generated.

DETAILED DESCRIPTION OF THE PREFERRED EMBODIMENT

Figure 1:
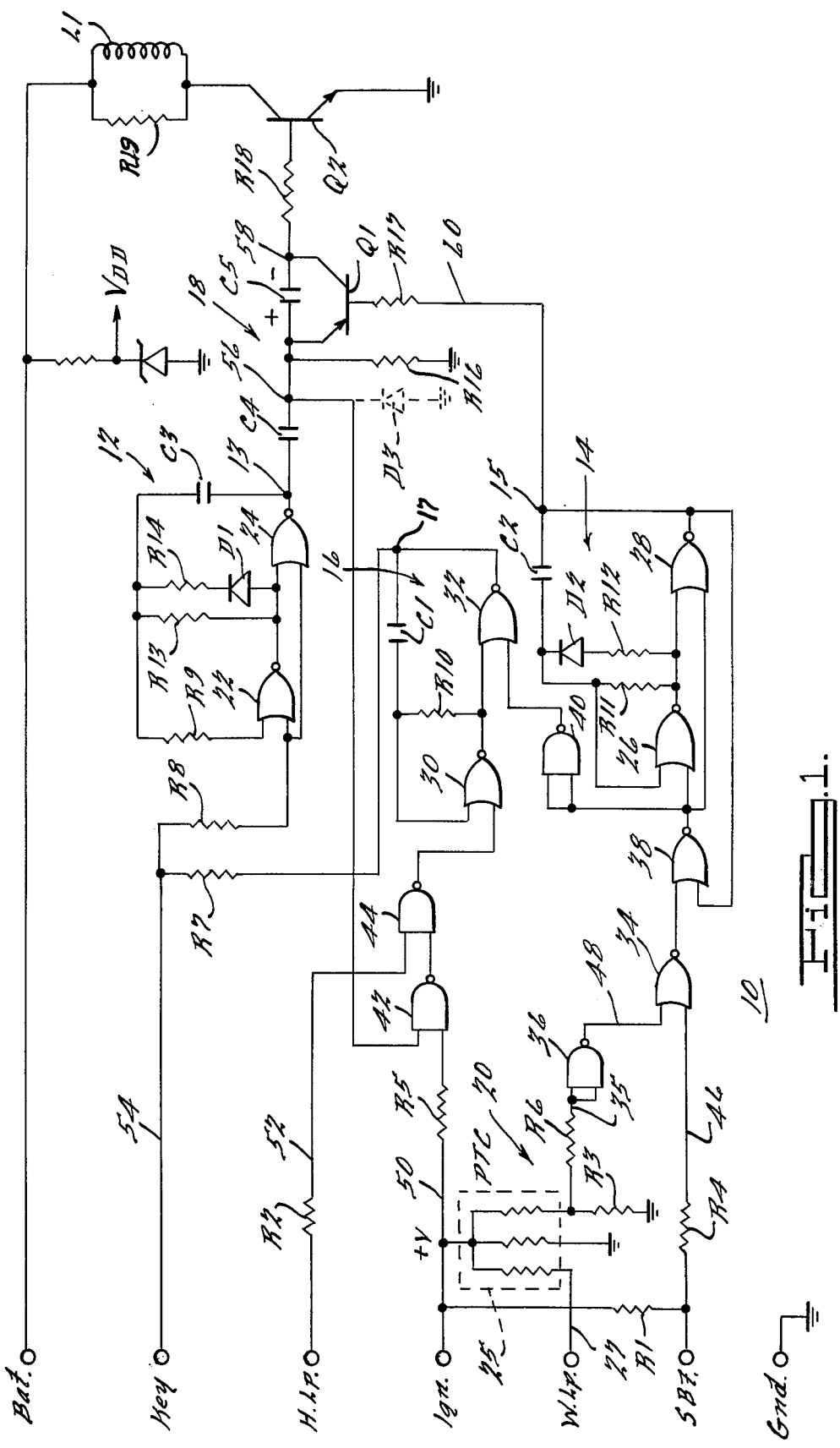
FIG. 1 is a circuit diagram of a control circuit according to the present invention.

Referring to FIG. 1, a circuit diagram of a control circuit 10 according to the present invention is shown. Basically, the present control circuit 10 comprises three oscillator circuits 12–16, a modulator circuit 18 for producing the chime effect, and a timing circuit 20 for providing the four to eight second logic signal utilized to provide the prescribed seat belt warning signal. The control circuit 10 is adapted to drive a tone generator, represented by coil L1 and resistor R19, preferably of the type disclosed in the copending U.S. application of Irvin Rea et al., entitled "Tone Generator", Ser. No. 917,174, filed June 20, 1978, and assigned to the assignee of the present invention.

The timing circuit 20 is basically comprised of a triple PTC element 25, as well as resistors R3 and R6. The triple PTC element 25 utilized in the preferred embodiment herein is of the type described in the copending U.S. application of Michael Slavin et al., entitled "Tone Generator and Control Circuit Therefor", Ser. No. 814,417, filed July 11, 1977, also assigned to the assignee of the present invention. The timing circuit 20 is adapted to provide a HI logic signal on line 35 for the initial four to eight second time period after the ignition has been turned on. In addition, the timing circuit 20 is further adapted to provide a coincidentally timed signal on line 27 which is connected to a seat belt warning lamp located on the dashboard of the automobile.

The high frequency oscillator 12 comprises a pair of logic gates, herein NOR-gates 22 and 24, a capacitor C3 and resistors R9, R13 and R14. The values of the circuit components, and in particular capacitor C3, are selected so that oscillator 12 will produce a square wave output signal at node 13 at a frequency of approximately 750 Hz. Diode D1 is included in the oscillator circuit 12 to provide a greater than 50 percent duty cycle in the oscillator output signal.

The low frequency oscillator circuit 14 similarly comprises a pair of logic gates, herein NOR-gates 26 and 28, a capacitor C2 and resistors R11 and R12. The values of the circuit components, and in particular capacitor C2, are selected to provide a square wave output signal at node 15 having a frequency of approximately 0.75 Hz. Diode D2 is included in the oscillator circuit 14 to also produce a greater than 50 percent duty cycle in the output signal from oscillator 14.

Oscillator circuit 16 likewise comprises a pair of logic gates, herein NOR-gates 30 and 32, a capacitor C1 and a resistor R10. The values of capacitor C1 and resistor R10 are selected so that oscillator 16 produces a square wave output signal at node 17 at a frequency of approximately 1.5 Hz. Since a diode is not included in oscillator circuit 16, the output signal of the oscillator 16 has a 50 percent duty cycle.

As noted previously, the control circuit 10 of the present invention is adapted to produce three readily distinguishable sounds; i.e., a chime, a pulse tone, and a steady tone. As will subsequently be seen, the chime sound is produced whenever the signal on line 46 from the seat belt terminal is LO and the logic signal from the output of the timing circuit 20 on line 35 is HI. In addition, the pulse tone is produced whenever the signal on line 50 connected to the ignition terminal is LO and the signal on line 52 connected to the headlamp terminal is HI. Finally, the steady tone is produced whenever the signal on line 54 connected to key terminal is LO.

Whenever the ignition is initially turned on, the timed HI logic signal on line 35 causes a LO signal to be produced on line 48 from the output of inverter 36. However, the output of NOR-gate 34 will not go HI unless the signal on line 46 is also LO, indicating that the seat belts are not properly fastened. When this occurs, the HI signal produced at the output of NOR-gate 34 results in a LO signal at the output of NOR-gate 38, which enables the low frequency oscillator 14. In addition, the LO signal at the output of NOR-gate 38 is provided through an inverter 40 to one of the inputs of NOR-gate 32, thereby disabling oscillator circuit 16. Further, the resulting LO signal produced at the output of NOR-gate 32 is provided through resistor R7 to line 54, thereby enabling the high frequency oscillator 12. Thus, to reiterate, a HI signal at the output of NOR-gate 34 enables the low frequency and high frequency oscillator circuits 12 and 14 and disables the middle frequency oscillator circuit 16.

The square wave output signal from the high frequency oscillator circuit 12 is provided to a novel modulator circuit 18 which includes a pair of decay circuits. The first decay circuit is comprised of capacitor C4 and resistors R16 and R18. The second decay circuit is comprised of capacitor C5 and resistor R18. In the preferred embodiment herein, the value of capacitor C5 is approximately 100 times larger than the value of capacitor C4, hence the time constant associated with the first decay circuit is approximately 100 times faster than the time constant associated with the second decay circuit. The connection between capacitor C4 and the input of NAND-gate 42 essentially provides the electrical equivalent of a diode D3, shown in phantom between capacitor C4 and ground.

The application of the square wave output signal at node 13 from the high frequency oscillator 12 through capacitor C4 results in the modified waveform at node 56 shown in FIG. 2, with the slope of the declining portion of the waveform being determined by the discharge rate of capacitor C4, through resistor R18 and transistor Q2 to ground. The charge on capacitor C4 is principally discharged through resistor R18 and transistor Q2 to ground, rather than through resistor R16 to ground, due to the fact that the value of resistor R16 is substantially larger than the value of resistor R18. The sole purpose of resistor R16 is thus to ensure that transistor Q2 turns completely off between pulses.

When the low frequency oscillator circuit 14 is enabled, the output signal therefrom at node 15 is normally HI, due to the large percentage duty cycle of the signal. Hence, transistor Q1, which has its base connected through resistor R17 to the output of oscillator 14, is normally off. As a result, the signal at node 56 is further modified by the substantially slower time constant of the second decay circuit as capacitor C5 "discharges" through resistor R18 and transistor Q2 to ground. In actuality, capacitor C5 is initially discharged in that both sides of the capacitor are at B+, and is thereafter charged negatively with respect to ground. However, because it is less confusing if a capacitor is considered to be charging when the potential is going up and discharging when the potential is going down, the condition of capacitor C5 will be described in this manner. Accordingly, it will be appreciated that the signal appearing at node 58 will correspond to that shown in FIG. 2, which is essentially the same as the waveform appearing at node 56 gradually declining at the "discharge" rate of capacitor C5. Thus, as can readily be seen from the timing diagram in FIG. 2, as the waveform at node 58 gradually declines, a lesser and lesser portion of the waveform will exceed the turn on threshold of the transistor Q2. Hence, the percentage on-time of the transistor Q2 will gradually decline thereby resulting in a corresponding decline in the duty cycle of the output signal from transistor Q2. Thus, the amplitude of the tone produced by the tone generator will also gradually diminish.

As noted previously, transistor Q1 is normally off when the low frequency oscillator 14 is enabled, as a result of the HI signal on line 60. The output of the low frequency oscillator 14 at node 15 will, however, briefly go LO approximately every 1.25 seconds. When this occurs, transistor Q1 will be momentarily turned on, thereby permitting capacitor C5 to "recharge" to B+ potential. The width of the LO pulse from the output of the low frequency oscillator 14 is approximately equivalent to the duration of seven high frequency pulses to ensure that the capacitor C5 will be fully "charged" while transistor Q1 is on. Thus, it will be appreciated that the amplitude of the tone produced by the tone generator will repeatedly slowly diminish and then "restrike" at the frequency of the low frequency oscillator 14.

When the low frequency oscillator circuit 14 is disabled, the output thereof at node 15 is LO, therefore transistor Q1 is turned on. Under such circumstances, capacitor C5 is effectively removed from the circuit. As a result, the signal appearing at node 56 will be provided directly through resistor R18 to the base of transistor Q2. Thus, it can be seen that the steady tone is produced merely by providing a LO signal on line 54 to enable the high frequency oscillator circuit 12. A LO signal is provided on line 54 whenever the door of the vehicle is opened while the key is in the ignition. Since the turn-on threshold of transistor Q2 is relatively low, the transistor effectively "sees" a square wave signal at its base. Hence, the tone generator will produce a steady tone determined by the frequency of the high frequency oscillator 12.

When the headlamps are left on after the ignition has been turned off, a HI signal will appear on line 52 and a LO signal will appear on line 50. The LO signal on line 50 is inverted by NAND-gate 42, thus resulting in both inputs to NAND-gate 44 being HI. The output of NAND-gate 44 will accordingly go LO, thereby enabling the mid-frequency oscillator 16. The square wave output signal from oscillator 16 at node 17 is provided through resistor R7 to the enable line 54 of the high frequency oscillator 12. The high frequency oscillator 12, therefore, will be repeatedly enabled and disabled at the frequency of oscillator 16. Thus, it will be appreciated that the tone generator will produce a pulse tone with the frequency of the tone being determined by the frequency of the high frequency oscillator 12 and the rate of the tone being determined by the frequency of oscillator 16.

While the above description constitutes the preferred embobiment of the invention, it will be appreciated that the invention is susceptible to modification, variation and change without departing from the proper scope or fair meaning of the accompanying claims.

What is claimed is:

1. In a control circuit for a tone generator that is adapted to cause said tone generator to produce a chime sound including a first oscillator for producing a relatively high frequency signal and a second oscillator for producing a relatively low frequency signal, the improvement comprising:
    modulating means for producing a pulse width modulated substantially square wave signal at the frequency of said high frequency signal and having a duty cycle that gradually diminishes from a high to a low percentage value during the period of each cycle of said low frequency signal; said modulating means including a first decay circuit connected to the output of said first oscillator and having associated therewith a relatively fast time constant, a second decay circuit having associated therewith a relatively slow time constant that determines the rate at which the percentage duty cycle of said pulse width modulated signal gradually diminishes, reset means for resetting said second decay circuit in accordance with said low frequency signal, and threshold means connected to the output of said second decay circuit for producing said pulse width modulated signal.

2. The control circuit of claim 1 wherein said second decay circuit is connected in series with said first decay circuit.

3. The control of claim 2 wherein said first decay circuit includes a first capacitor connected in series with the output of said first oscillator and said second decay circuit includes a second capacitor connected in series with said first capacitor.

4. The control circuit of claim 3 wherein the value of said second capacitor is substantially larger than the value of said first capacitor.

5. The control circuit of claim 1 wherein said reset means includes an electronic switching device connected across said second decay circuit that is adapted to short out said second decay circuit upon receipt of a reset signal from said second oscillator.

6. The control circuit of claim 1 wherein the high frequency signal produced by said first oscillator is a substantially square wave signal.

7. The control circuit of claim 6 wherein the duty cycle of said high frequency signal is substantially greater than 50 percent.

8. The control circuit of claim 1 wherein the time constant of said first decay circuit is approximately 100 times faster than the time constant of said second decay circuit.

9. The control circuit of claim 1 wherein the frequency of said high frequency signal is approximately 1000 times faster than the frequency of said low frequency signal.

10. A control circuit for a tone generator that is adapted to cause said tone generator to produce a plurality of readily distinguishable audible sounds including a chime sound, a pulse tone and a steady tone, including:
    a first oscillator for producing a relatively high frequency signal;
    a second oscillator for producing a relatively low frequency signal;
    a third oscillator for producing a middle frequency signal;
    modulating means for producing a pulse width modulated substantially square wave signal at the frequency of said high frequency signal and having a duty cycle that gradually diminishes from a high to a low percentage value during the period of each cycle of said low frequency signal;
    first circuit means for enabling said first oscillator, said second oscillator and said modulating means for producing said chime sound;
    second circuit means for enabling said third oscillator and said first oscillator in accordance with said middle frequency signal from said third oscillator for producing said pulse tone; and
    third circuit means for enabling said first oscillator for producing said steady tone.

11. The control circuit of claim 10 wherein said second and third circuit means are further adapted to disable said modulating means.

12. The control circuit of claim 11 wherein said modulating means includes a first decay circuit connected to the output of said first oscillator and having associated therewith a relatively fast time constant, a second decay circuit having associated therewith a relatively slow time constant that determines the rate at which the percentage duty cycle of said pulse width modulated signal gradually diminishes, reset means for resetting said second decay circuit in accordance with said low frequency signal, and threshold means connected to the output of said second decay circuit for producing said pulse width modulated signal.

13. The control circuit of claim 12 wherein said reset means includes an electronic switching device connected across said second decay circuit that is adapted to short out said second decay circuit upon receipt of a reset signal from said second oscillator.

14. The control circuit of claim 13 wherein said second and third circuit means are adapted to disable said modulating means by providing a continuous reset signal to said switching device.

15. The control circuit of claim 14 wherein said threshold means is adapted to produce a substantially square wave signal at the frequency of said high frequency signal whenever said first oscillator is enabled while said modulating means is disabled.

16. The control circuit of claim 10 wherein said first circuit means is further adapted to disable said third oscillator.

17. The control circuit of claim 10 wherein said control circuit is utilized on an automobile to monitor a plurality of predefined conditions and each of said first, second and third circuit means is responsive to the occurrence of one of said predefined conditions.

18. The control circuit of claim 17 wherein said first circuit means further includes a timing circuit for automatically disabling said first circuit means a predefined period of time after the occurrence of its respective monitored condition.

19. The control circuit of claim 18 wherein said first circuit means is adapted to be responsive to the receipt of a signal that is produced whenever the automobile ignition is turned on and the seat belts are not properly buckled.

20. The control circuit of claim 17 wherein said second circuit means is adapted to be responsive to the receipt of a signal that is produced whenever the automobile headlamps are left on after the ignition has been turned off.

21. The control circuit of claim 17 wherein said third circuit means is adapted to be responsive to the receipt of a signal that is produced whenever the ignition key is in the ignition when a door of the automobile is opened.

* * * * *